United States Patent
Mohamed et al.

[11] Patent Number: 5,899,994
[45] Date of Patent: May 4, 1999

[54] FLEXIBLE TRANSLATION STORAGE BUFFERS FOR VIRTUAL ADDRESS TRANSLATION

[75] Inventors: Ahmed H. Mohamed, Berkeley; Adrian D. Caceres, Sunnyvale, both of Calif.

[73] Assignee: Sun Microsystems, Inc., Palo Alto, Calif.

[21] Appl. No.: 08/884,368

[22] Filed: Jun. 26, 1997

[51] Int. Cl.[6] ........................................... G06F 12/08
[52] U.S. Cl. ...................... 707/100; 711/202; 711/203; 711/206; 711/207; 711/212; 711/118
[58] Field of Search ................................. 711/207, 202, 711/203, 206, 212, 118; 707/100

[56] References Cited

U.S. PATENT DOCUMENTS

| | | | |
|---|---|---|---|
| 4,376,297 | 3/1983 | Anderson et al. | 364/200 |
| 5,479,627 | 12/1995 | Khalidi et al. | 711/205 |

FOREIGN PATENT DOCUMENTS

| | | |
|---|---|---|
| 0 176 939 A1 | 4/1986 | European Pat. Off. . |
| WO 89/00727 | 1/1989 | WIPO . |

OTHER PUBLICATIONS

Madhusudhan Talluri et al., "Tradeoffs in Supporting Two Page Sizes," May 1992, Computer Architecture News, vol. 20, No. 2, pp. 415–424.

*Primary Examiner*—Paul Kulik
*Assistant Examiner*—Jean R. Homere
*Attorney, Agent, or Firm*—Beyer & Weaver, LLP

[57] ABSTRACT

A technique for managing address translation storage buffers (TSBs) supports multiple pools of different TSB sizes and dynamically assigns a process to its own TSB of the proper size as the needs of the process change. A process is assigned a small TSB and the system migrates the process to a larger TSB if needed. One method includes the steps of identifying sizes of TSBs to support, allocating a TSB pool in memory with these sizes, selecting an appropriately sized TSB for a process, and migrating that process to a larger size should the process require more memory. A second method allocates a TSB pool by determining an appropriate size for the TSB pool, determining sizes of TSBs to support, allocating memory for the pool and initializing status block for each size of TSB. A third method selects an appropriate TSB for a process by selecting a smallest supported size of a TSB from the pool. A fourth method migrates a process to a larger size by determining whether the current TSB is of an inappropriate size, selecting a larger TSB size, invalidating the previous TSB, and selecting a TSB of the new size from the TSB pool. Variations on these methods require that the memory spaces shared by the TSBs of different sizes are coexistent, require that the TSBs be stored in virtual space or that entries in the translation look-aside buffer (TLB) be reserved for a separate user TSB and kernel (system) TSB.

36 Claims, 10 Drawing Sheets

FLEXIBLE TRANSLATION STORAGE BUFFERS FOR VIRTUAL ADDRESS TRANSLATION

CROSS-REFERENCE TO RELATED APPLICATIONS

This application is related to U.S. Pat. No. 5,479,627, filed on Sep. 8, 1993 entitled "Virtual Address to Physical Address Translation Cache that Supports Multiple Page Sizes", by inventors Anderson et al., which is hereby incorporated by reference.

FIELD OF THE INVENTION

The present invention relates generally to an addressing scheme within a computer system. More specifically, the present invention relates to a flexible cache for virtual address translation.

BACKGROUND OF THE INVENTION

Within a computer system, the power and speed of computing is often limited by the actual physical memory (such as random access memory) that a central processing unit (CPU) can address. Generally speaking, a CPU can address many orders of magnitude more memory locations than actually exist in RAM. Thus, the virtual address space of a CPU is usually much greater than the actual memory space of a computer system. To remedy this deficiency, it is well known to use a virtual storage (often called virtual memory) technique for utilizing the full virtual address space of the CPU.

Virtual storage is the notion of storage space that may be regarded as addressable main storage by the user of a computer system in which virtual addresses are mapped into real addresses in physical memory. The size of virtual storage is limited by the addressing scheme of the computer system (such as of the CPU) and by the amount of auxiliary storage available and not by the actual number of real storage locations. Simply put, virtual addresses generated by a CPU may actually refer to storage locations outside of the internal physical memory of the computer, such as on a hard disk.

FIG. 1 illustrates symbolically a virtual address translation technique 10 within a computer system. Process address space 12 is a range of virtual addresses assigned to a particular process running on a CPU while physical address space 14 is the range of actual physical memory (such as RAM) available within the computer system. In the example shown, all addresses generated by a CPU for the process are virtual addresses and need to be translated into a physical address before a data element at that address can be accessed. Process address space 12 ranges from a virtual address of 0 to a virtual address of $2^{N-1}$. Physical address space 14 ranges from a physical address of 0 up to $2^{M-1}$, where the range of virtual addresses is typically much greater than the range of physical addresses. In a computer system where a CPU has 64-bit addressing capability, N=64, while the value of M may only be M=24.

In this example, the virtual address space of the process includes a section of code 16, data 18 and a stack 20. A page 22 of code 16 is mapped to a page 24 in the physical address space. Also, page 26 of data 18 is mapped to a page 28 of the physical address space. Thus, a page in the virtual address space is mapped to any page within the physical address space and a translation mechanism is needed to provide such mapping.

An increasing number of architectures provide such virtual storage support through software-managed translation look-aside buffers (TLBs). This trend is mainly due to the advent of 64-bit address space which requires huge amounts of physical memory to hold the address translation page tables. A TLB is a small hardware cache of the most recent virtual to physical address translations in the system and is managed by the operating system. During a TLB miss (i.e., when a mapping is not found in the TLB), the hardware traps into the kernel which loads a new virtual to physical translation. This dynamic approach is very flexible but depends on a high cache hit ratio and on a fast TLB-miss trap handling.

FIG. 2 illustrates in detail an example 50 of an entry in such a TLB. Shown is a TLB 52 within a CPU 54 that has an entry 56. TLB 52 may have any number of entries, although 64 entries are common. Also, there may be more than one TLB per CPU, for example, one TLB for instructions and one TLB for data. Entry 56, a translation table entry (TTE), provides a mapping from a virtual address to a physical address and includes a tag portion 58 and a data portion 60. The tag portion includes a process identifier 62 used to identify the process and a virtual address 64. The data portion includes the physical address 66 to which the virtual address is mapped and associated attributes 68. Attributes include useful parameters such as "protection", "supervisor/user state","modified", "valid", etc. A valid bit 70 is used to indicate if the entry is valid. Thus, by accessing the TLB hardware cache, A CPU is able to quickly translate a virtual address into a physical address.

However, a TLB is not able to hold all of the virtual addresses available to a CPU; thus, frequently the CPU cannot find a particular virtual address for a particular process in the TLB. This situation is called a "TLB miss". Typically, a TLB miss is handled in two ways. One technique uses hardware trap handling in order to map a virtual address when a TLB miss occurs. In hardware trap handling, the hardware uses tables in physical memory in order to look up the physical address for the given virtual address, termed a "page table walk". A number of nested segment tables and page tables are used to determine the physical address. Although this technique can be fast for 32-bit machines, it is generally not viable for 64-bit machines. With a 64-bit address space, the tables in hardware needed to implement this technique are extremely long and would take up far too much memory in the computer. Even if smaller tables are used, at least six levels of nesting of the tables may be necessary, resulting in a time-consuming look-up process. Thus, although hardware trap handling is useful for 32-bit machines, for machines with a larger address space (such as 64-bit machines) this technique is not extremely useful.

Another technique for dealing with a TLB miss is to let the operating system deal with the miss through software trap handling. Software trap handling may be implemented in many ways depending upon the system. Generally, it is desirable on a TLB miss to limit the number of memory accesses to one reference. One technique for such software trap handling uses a "translation storage buffer" (TSB) to support the TLB and is useful on larger address space machines such as on 64-bit machines. A translation storage buffer is useful on UltraSPARC work stations manufactured by Sun Microsystems, Inc. of Mountain View, California, running a Solaris version 2.6 operating system. A more detailed explanation of a translation storage buffer (TSB) may be found in the above-referenced patent application.

Such a TSB cache is backed by a table of all valid address mappings in the system. The TSB is a contiguous buffer in memory that is usually organized as a direct-mapped cache. The operating system uses the TSB for fast TLB-miss trap handling. The TLB miss trap handler searches the TSB for the missing address translation. If the search operation generates a hit, the address mapping is added to the TLB.

FIG. 3 illustrates symbolically one embodiment of a software trap handling technique 80. Shown is a translation look-aside buffer (TLB) 52, a translation storage buffer (TSB) 82 and a hash table 84. On a TLB miss, the operating system would next check TSB 82 to locate an address mapping. TSB 82 is an operating system data structure that caches the most recent address translations. The operating system uses the TSB for fast TLB-miss trap handling. On a TLB miss, the TLB miss trap handler searches TSB 82 for the missing address translation. If the search operation generates a hit, the address mapping is added to TLB 52. If an address mapping is not found in TSB 82, the operating system then checks hash table 84 which is a table of all valid address mappings in the system. Once the correct mapping is found, it is inserted in the TLB and into the TSB so that it may be found when needed next. Hash table 84 need not be a hash table, but may be any suitable data structure in memory. Thus, a TSB is a cache of recent address translations useful when a TLB miss occurs.

FIG. 4 shows in detail a TSB entry 90. As in the translation table entry (TTE) of FIG. 2, TSB entry 90 includes a process identifier 92, a virtual address 94, a physical address 96 and attributes 98. Also included is a valid bit 100 to indicate if the entry is valid.

Although a TSB is used in 64-bit machines (and is possible in 32-bit machines), there are disadvantages associated with the ways in which a TSB is used. Some systems use one global TSB for all CPUs available within a computer system. Thus, on a TLB miss for any of the CPUs within the computer system, only one TSB is used as a cache for recently used address translations. Use of one global TSB has certain drawbacks. For one, a global TSB may not have the capacity to adequately serve all processors within a computer system. That is, it may be difficult to make the global TSB large enough in memory to efficiently serve all of the processors. This decision is somewhat implementation dependent. A TSB might be given more memory at the expense of memory for users. Even with a large global TSB, context invalidation can be very costly in terms of time because the complete TSB must be walked in order to determine that an address translation is not present.

Also, with all processes on all CPUs using one TSB for caching translations, there is the problem of thrashing. Thrashing happens when different processes generate the same index into the TSB and "take one another out" in the global TSB, even though there are free slots in the TSB. Thrashing is a common problem where many processes vie for the use of one TSB. In particular, if an XOR function is used to generate an offset from a process identifier and a virtual address, then thrashing is likely to occur because the XOR function is not particularly suited for good distribution. Also, many systems are limited to a process identifier of 13 bits, which further limits the distribution of addresses in the TSB and thus leads to thrashing.

A further disadvantage of having only one global TSB is that this TSB is fixed in size, whereas each process has different characteristics and needs. In other words, a simple process such as a shell or mail program may only require a very small TSB, whereas a large database application may require an extremely large TSB to be able to map to many more addresses. The global TSB, being of only one size, is inflexible and leads to inefficiency in address translation for these different types of processes. Inefficiency also results during a TSB flush operation when the complete TSB must be walked to invalidate entries for a process no longer in use.

Aside from the global TSB approach, other systems assign a single TSB to each CPU within a multi-processor computer system. The TSB capacity problem is alleviated because many more TSBs are available for use. However, this "TSB per CPU" approach has other disadvantages. Thrashing is reduced between processes on different CPUs, but processes on the same CPU will still encounter thrashing on the TSB to which that CPU is assigned. Thus, thrashing is reduced but not eliminated. Furthermore, as in the global TSB technique, each of these TSBs is of a fixed size and is not tailorable to the needs of a particular process.

Another drawback of this technique is excessive memory usage since each CPU is allocated a private TSB. For larger systems, often the worst case must be assumed for each TSB per CPU, resulting in large amounts of space being assigned to each TSB. If a CPU is unused, or if only a small portion of the TSB is used, then space is wasted.

Also, because there is only one TSB per CPU, there may be duplicate translations for a kernel variable in different TSBs. For example, if a first CPU has a TLB miss for a kernel variable A, it places a translation in its TSB. However, if a second CPU also has a TLB miss for the same kernel variable A, it will place a duplicate translation for that kernel variable in its own TSB, resulting in duplication of effort. Another disadvantage of this technique is that a process migrating from one CPU to another must continuously repopulate its new TSB with its address translations, resulting in more inefficiency. This is known as a cold cache syndrome.

Another problem with each of the above approaches is the cost of TSB context invalidation due to context invalidation. This cost is critical in multi-user environments where a large number of small processes are created and destroyed. Especially with a large global TSB, it can be very time consuming to search the complete TSB to invalidate one context. Likewise with the TSB per CPU approach, each TSB may have to be searched to invalidate a context. Also, another drawback common to both of the above techniques is that there is no separate TSB for system uses. The global TSB, or each per processor TSB must be used for both user and system processes.

In addition, the embodiments described above store a TSB in physical memory. For example, a global TSB may be of a size that it can be stored in the nucleus of the kernel. In the TSB per processor embodiment, each TSB is typically of a larger size and is not stored in the kernel but rather outside of the kernel in physical memory. A greater shortage of physical memory within the computer system results from these techniques.

Therefore, a TSB implementation technique is desirable for large address space computer systems that would minimize or eliminate TSB thrashing between different processes and would reduce the cost of TSB context invalidation.

SUMMARY OF THE INVENTION

To achieve the foregoing, and in accordance with the purpose of the present invention, a variety of methods, apparatus and computer readable medium implementations of a flexible TSB pool are disclosed providing any number of differently sized TSBs that are assigned dynamically one to a process.

In the present invention, a pool of TSBs is allocated over which processes are uniformly distributed. This allows the use of smaller TSB sizes than in per-processor TSB architectures and reduces the cost of TSB context validation. Dynamic TSB resizing is supported for larger processes requiring more memory. Initially, a process is assigned a small TSB and as the process address space waxes and exceeds a certain threshold, the system will migrate the process to a larger TSB. The ability of the present invention to resize a process TSB dynamically allows the system to adopt to different process sizes while achieving a low TSB context invalidation overhead. In addition, with the ability to assign a separate TSB to each process, thrashing is practically eliminated.

Embodiments of the present invention relate to computer-readable media incorporating novel methods. One method includes the steps of identifying sizes of TSBs to support, allocating a TSB pool in memory with these sizes, selecting an appropriately sized TSB for a process, and migrating that process to a larger size should the process require more memory. A second method allocates a TSB pool by determining an appropriate size for the TSB pool, determining sizes of TSBs to support, allocating memory for the pool and initializing status block for each size of TSB. A third method selects an appropriate TSB for a process by selecting a smallest supported size of a TSB from the pool. A fourth method migrates a process to a larger size by determining whether the current TSB is of an inappropriate size, selecting a larger TSB size, invalidating the previous TSB, and selecting a TSB of the new size from the TSB pool. Variations on these methods require that the memory spaces shared by the TSBs of different sizes be coexistent, require that the TSBs be stored in virtual space or that entries in the TLB be reserved for a user TSB and a kernel TSB.

Furthermore, another embodiment of the present invention provides a user TSB pool for user processes and a single kernel TSB for system processes. However, only one hardware TSB register is needed to indicate the location of the current user TSB in physical memory because the kernel TSB is located in the nucleus data area of the kernel in a known location. Thus, both a current user TSB and a kernel TSB are able to be accessed simultaneously by the system. Also, the kernel TSB could be stored in physical memory and use a physical rather than a virtual address.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE INVENTION

The present invention is applicable to most any virtual storage implementation. Virtual storage is useful on a computer where any type of memory hierarchy is used, such as memory existing in a cache, in ROM, in RAM, or on a mass storage device external to the computer. In such an example, virtual storage is able to hide this multi-level memory. Virtual storage is also useful with highly parallel multi-computers that are hooked together by an interconnection network. Virtual storage then allows one processor to refer to a data element in another computer's memory. In this example, virtual storage is able to hide distributed memory.

Figure 1:
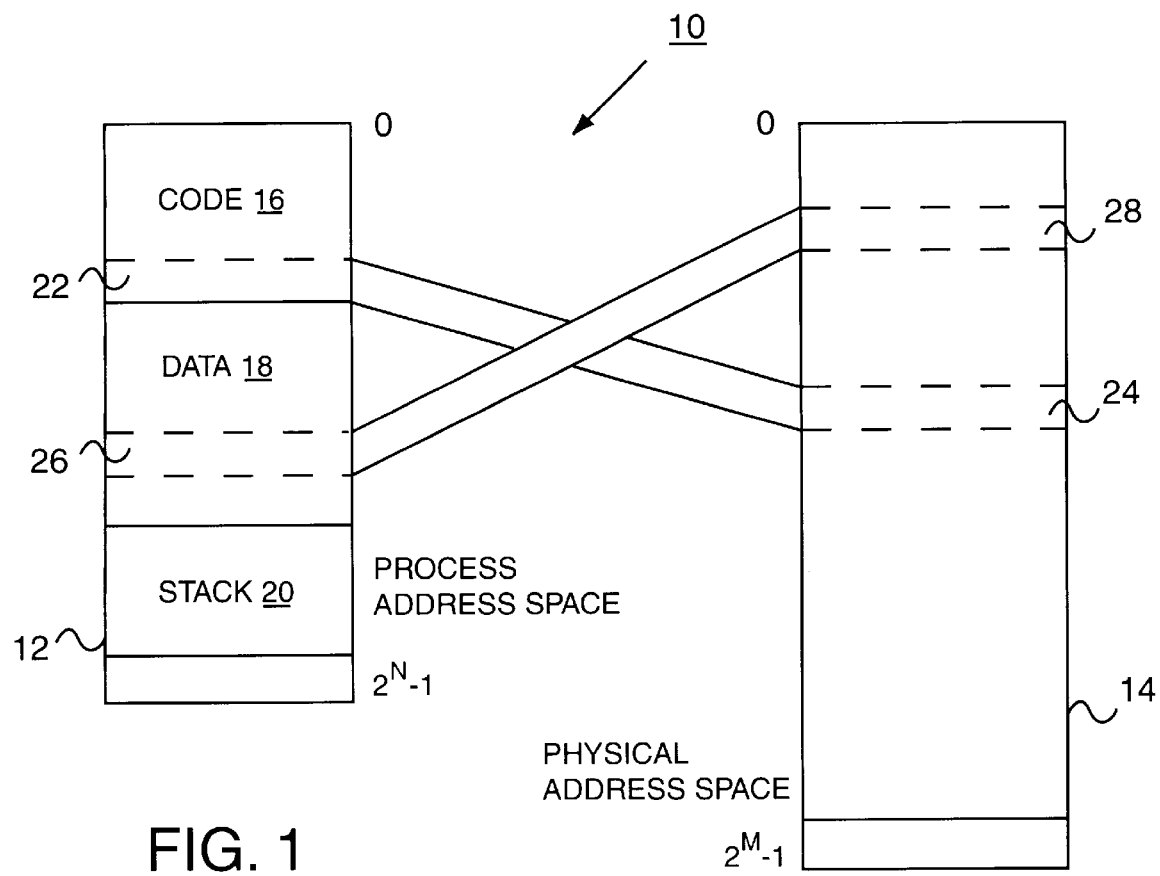
FIG. 1 illustrates symbolically translation of virtual addresses to physical addresses.
Figure 3:
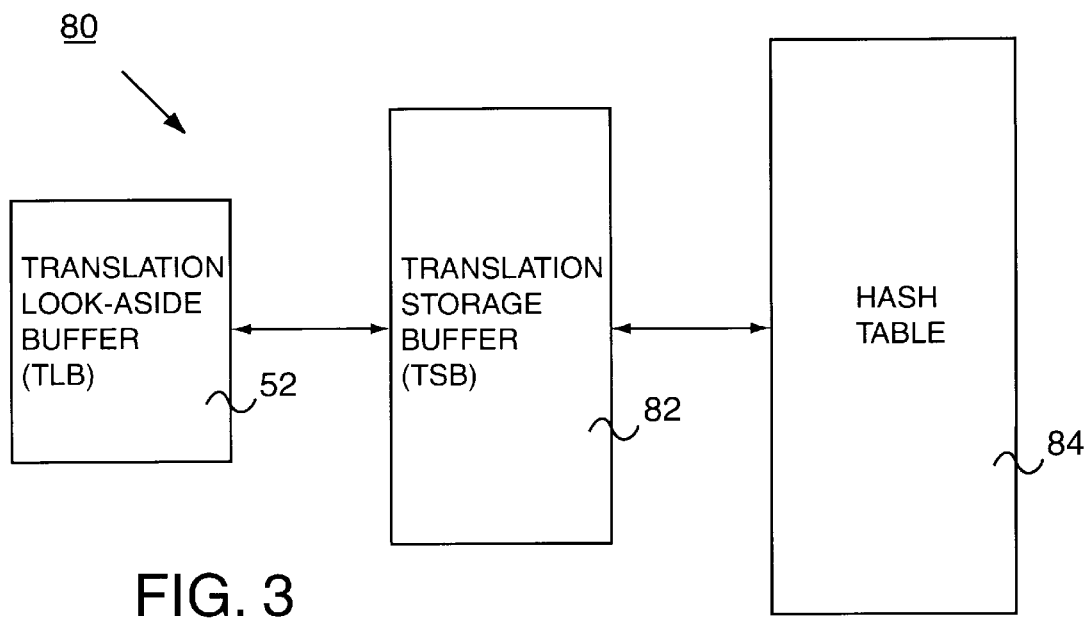
FIG. 3 illustrates the use of a translation storage buffer (TSB) for use after a TLB miss.
Figure 2:
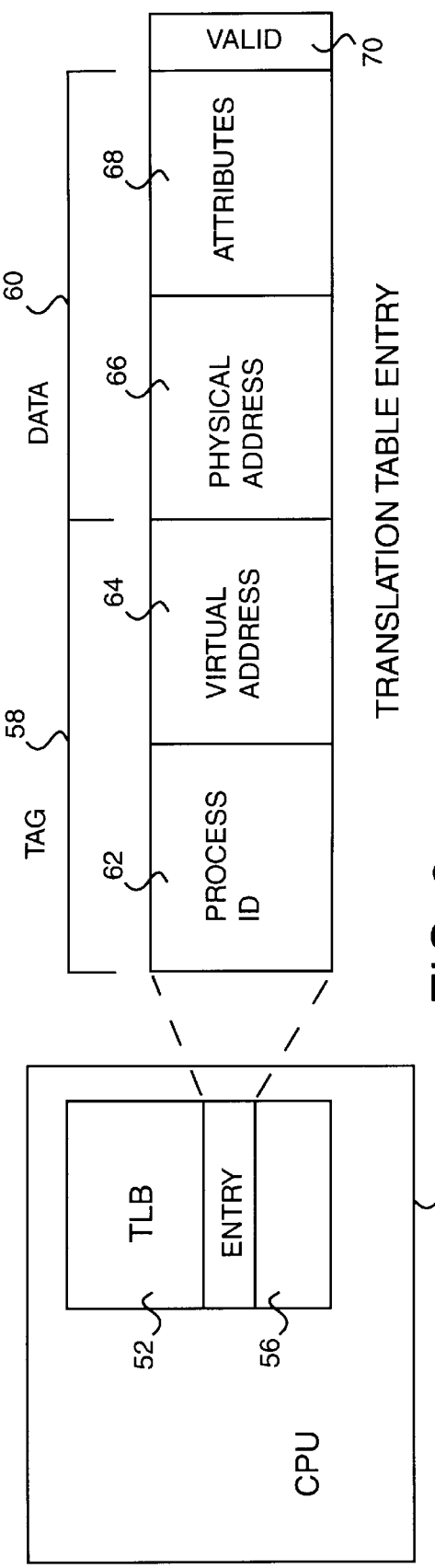
FIG. 2 is a translation table entry (TTE) of a translation look-aside buffer (TLB).
Figure 4:
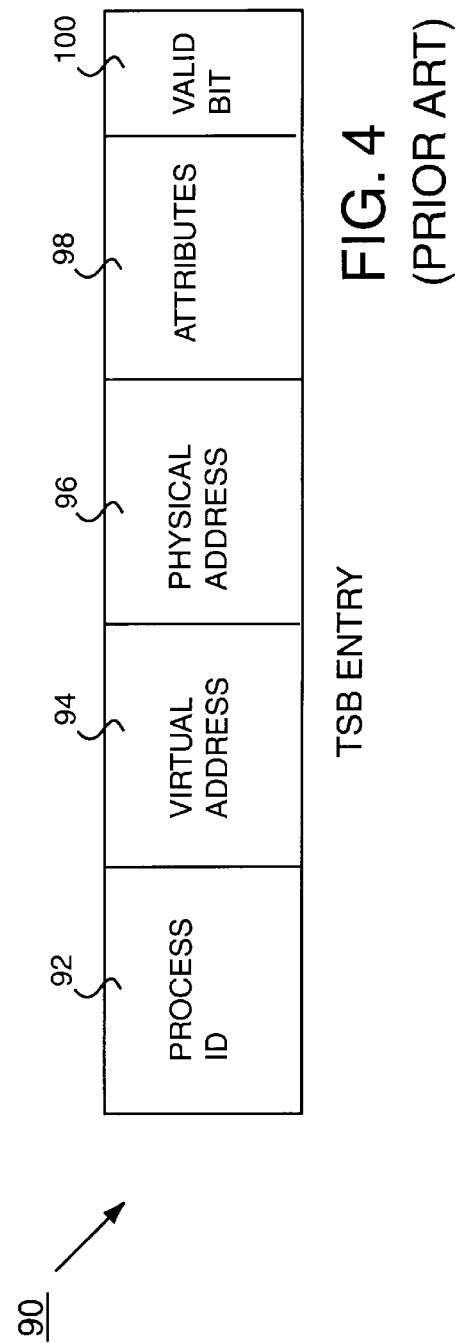
FIG. 4 shows in detail an entry of a translation storage buffer (TSB).
Figure 5:
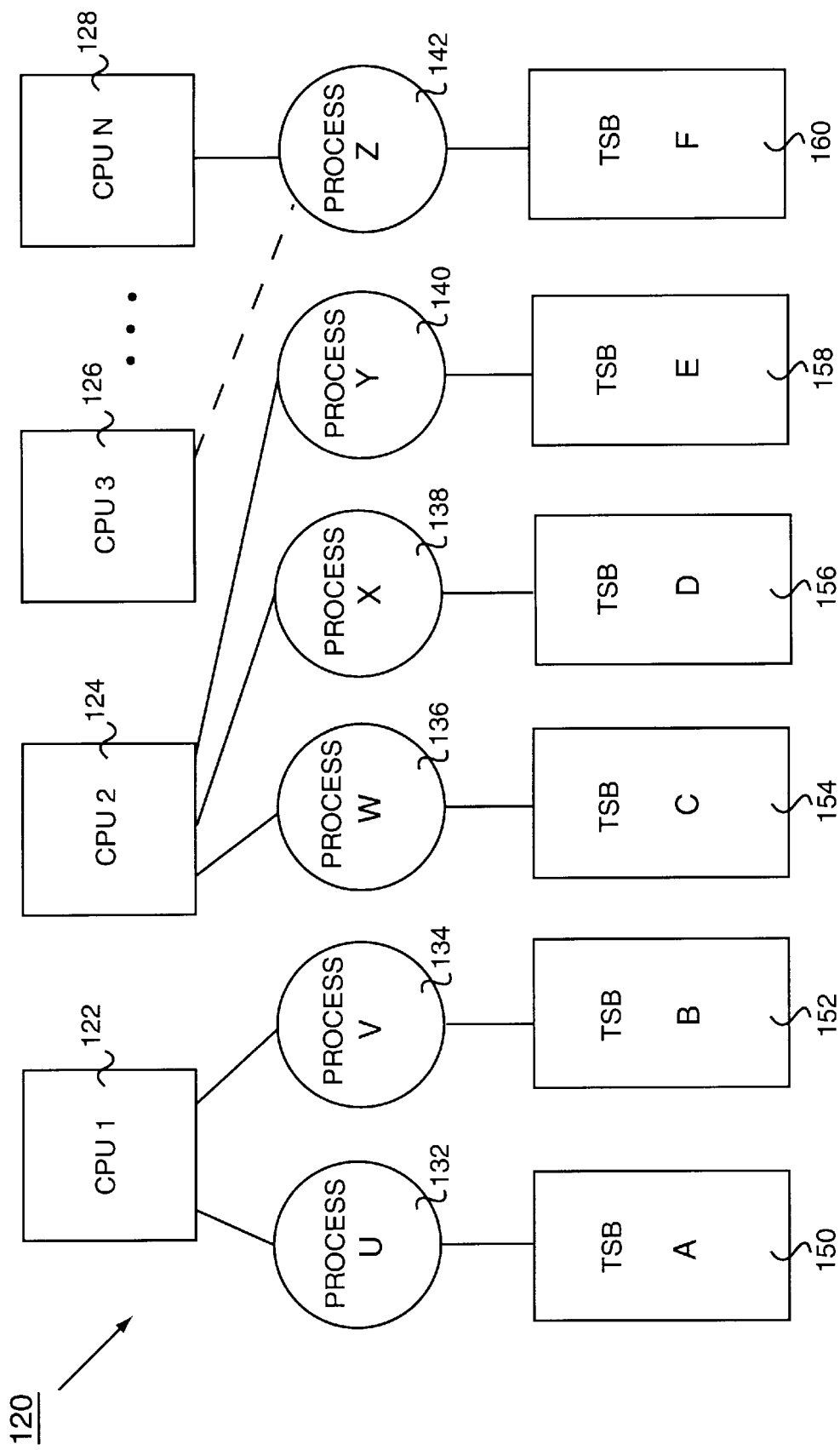
FIG. 5 illustrates an embodiment of the present invention in which any number of processes running on a multiple processor computer system are each associated with a variable size TSB.

The present invention provides an architecture where a pool of TSBs is allocated over which processes are statistically multiplexed. Each process is preferably assigned to its own TSB, although more than one process may be assigned to a given TSB. FIG. 5 is a block diagram illustrating a multi-processor computer system 120 having any number of CPUs 122 through 128. Within the computer system are any number of processes, such as processes 132 through 142. Also provided are any number of TSBs, such as TSBs 150 through 160. Each TSB may be implemented in a wide variety of manners. By way of example, each TSB is implemented as a direct mapped cache, although each TSB could be implemented in other ways, such as a set associative cache.

In this example, process U and process V both run on CPU 1, processes W, X and Y all run on CPU 2, and process Z has migrated from CPU 3 to CPU N. Each process is associated with one TSB even if the process moves between CPUs. Process U is assigned TSB A, process V is assigned TSB B, process W is assigned TSB C, process X is assigned TSB D, process Y is assigned TSB E and process Z is assigned TSB F. By assigning one TSB to each process, thrashing is eliminated between different processes and TSB context invalidation is reduced. Furthermore, each of the TSBs may be of a different size to correspond to the needs of its particular process, and larger TSBs may be dynamically assigned to a process as the needs of that process change. As will be explained below, the operating system allocates a pool of TSBs on system startup, thus TSB migration is supported without any new memory allocations.

Figure 6A:
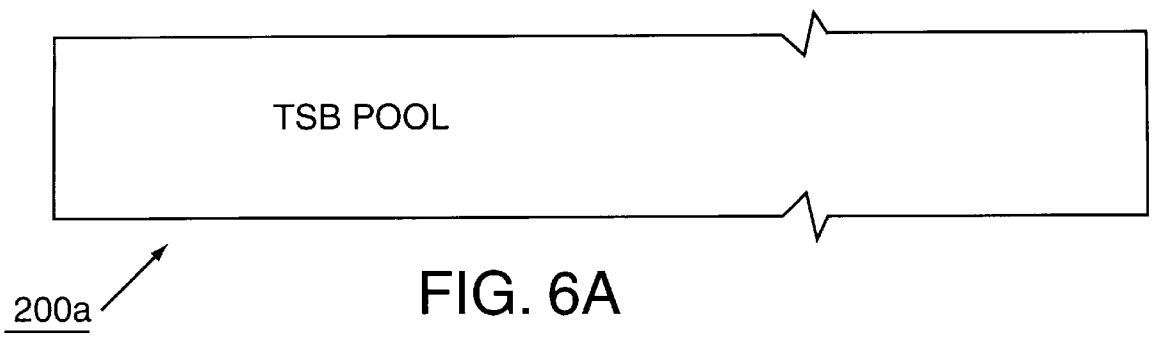
FIGS. 6A through 6D illustrate embodiments of a TSB pool in accordance with the present invention.

FIGS. 6A through 6D show various embodiments of the present invention in which a TSB pool is allocated in different ways. FIG. 6A shows a generic TSB pool 200a that is present in the physical memory of the computer. TSB pool 200a may be allocated at any time and be of any size. Preferably, the TSB pool has memory allocated for it at system startup, and a variety of parameters are used to determine its optimal size. Those parameters include: physical memory of the system, number of CPUs, maximum number of processes set by a system administrator, etc. In one embodiment of the invention, the size of the TSB pool is calculated as a function of the installed physical memory. For example, if memory is less than 32 Mbytes, then the TSB pool contains one TSB of 128 K bytes. If memory is in-between 32 Mbytes and 4 Gigabytes, then a TSB of 512 K bytes is allocated for each 32 Mbytes of memory in order to form the TSB pool. If memory is greater than 4 Gigabytes, then a TSB of 512 K bytes is allocated for each 32 Mbytes of memory up to a variable limit of 250 TSBs. The limit may be adjusted by a system administrator.

Figure 6B:
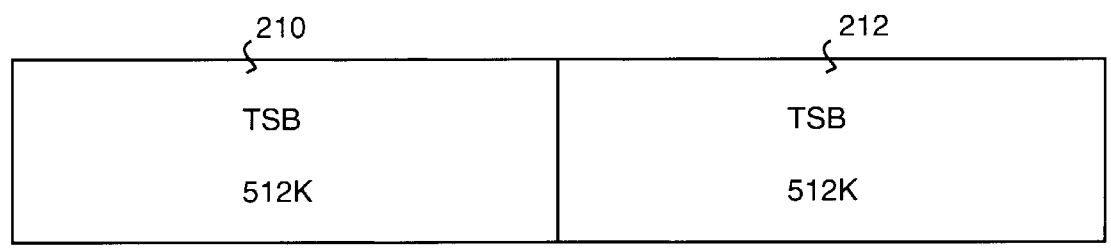

FIG. 6B shows an embodiment of a TSB pool 200b having a TSB 210 and a TSB 212. Each of the TSBs has a size of 512 k bytes. Of course, many other TSBs of a size of 512 k may be present in this TSB pool.

Figure 6C:
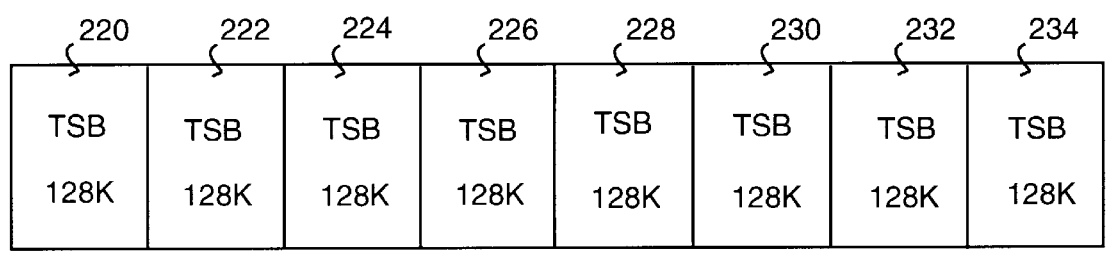

FIG. 6C shows yet another embodiment of a TSB pool 200c having a number of TSBs, namely TSB 220 through TSB 234. Each of these TSBs has a size of 128 k bytes. In a preferred embodiment of the invention, at system startup a pool of 512 k TSBs are allocated from outside the kernel nucleus area. Each of the 512 k TSBs are further divided into four 128 k TSBs. Logically, the system maintains two different pools of 128 k and 512 k TSBs. However, both pools share the same underlying physical storage which allows efficient utilization of the allocated space. Of course, a TSB pool may contain many TSBs of different sizes to accommodate the needs of different processes.

Figure 6D:
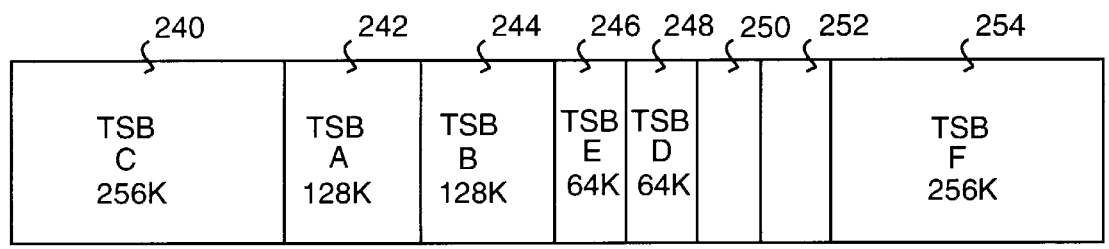

For example, FIG. 6D shows yet another embodiment of a TSB pool 200d having a variety of sizes for TSBs which are used to accommodate the variety of processes shown in FIG. 5. In this example, TSB C 240 has a size of 256 k and is associated with process W of FIG. 5. Similarly, TSB A 242 has a size of 128 k and is associated with process U of FIG. 5. In a similar fashion, TSB B 244 has a size of 128 k. Both of TSB E 246 and TSB D 248 each have a size of 64 k. TSB F 254 has a size of 256 k. Of course, other processes may be present that have sizes similar to those shown or sizes that may be smaller or larger. The present invention is able to flexibly assign a TSB associated with a particular process a particular size based upon the needs of the process. In a preferred embodiment of the invention, when a new process is created, the system assigns to it a 128 k TSB. TSBs are then assigned to processes in a round robin fashion. As the process address space increases and exceeds three-quarters of its TSB size, the system migrates the process to a 512 k TSB. This dynamic policy allows the system to adapt to different work loads and to minimize the cost of TSB context invalidation. It also reduces TSB thrashing between different processes since different process are assigned to different TSBs.

A TSB pool of the present invention may be stored within the computer system in a wide variety of manners. As described above, the TSB pool may be stored in the physical memory of the computer. In a preferred embodiment, the TSB pool is stored in virtual storage. In other words, the address of the TSB pool is a virtual address. Although the TSB pool may actually be in physical memory, the addresses for each TSB are virtual addresses. This is advantageous if the size of the TSB pool needs to be dynamically shrunk or grown while the computer is operating. For example, for certain large systems that should not be brought down, an administrator may add more memory to the system while it is running. The TSB pool may then be dynamically increased in size without the need to restart the system and allocate more physical memory to the TSB pool.

Furthermore, the TSB pool need not be stored in contiguous virtual storage. In a preferred embodiment of the invention, each individual TSB within the TSB pool occupies a region of virtual storage that need not be contiguous with another TSB. Preferably, though, the largest chunk sizes for the TSBs do occupy continuous storage locations and are aligned on proper physical and virtual boundaries according to their size.

Figure 7:
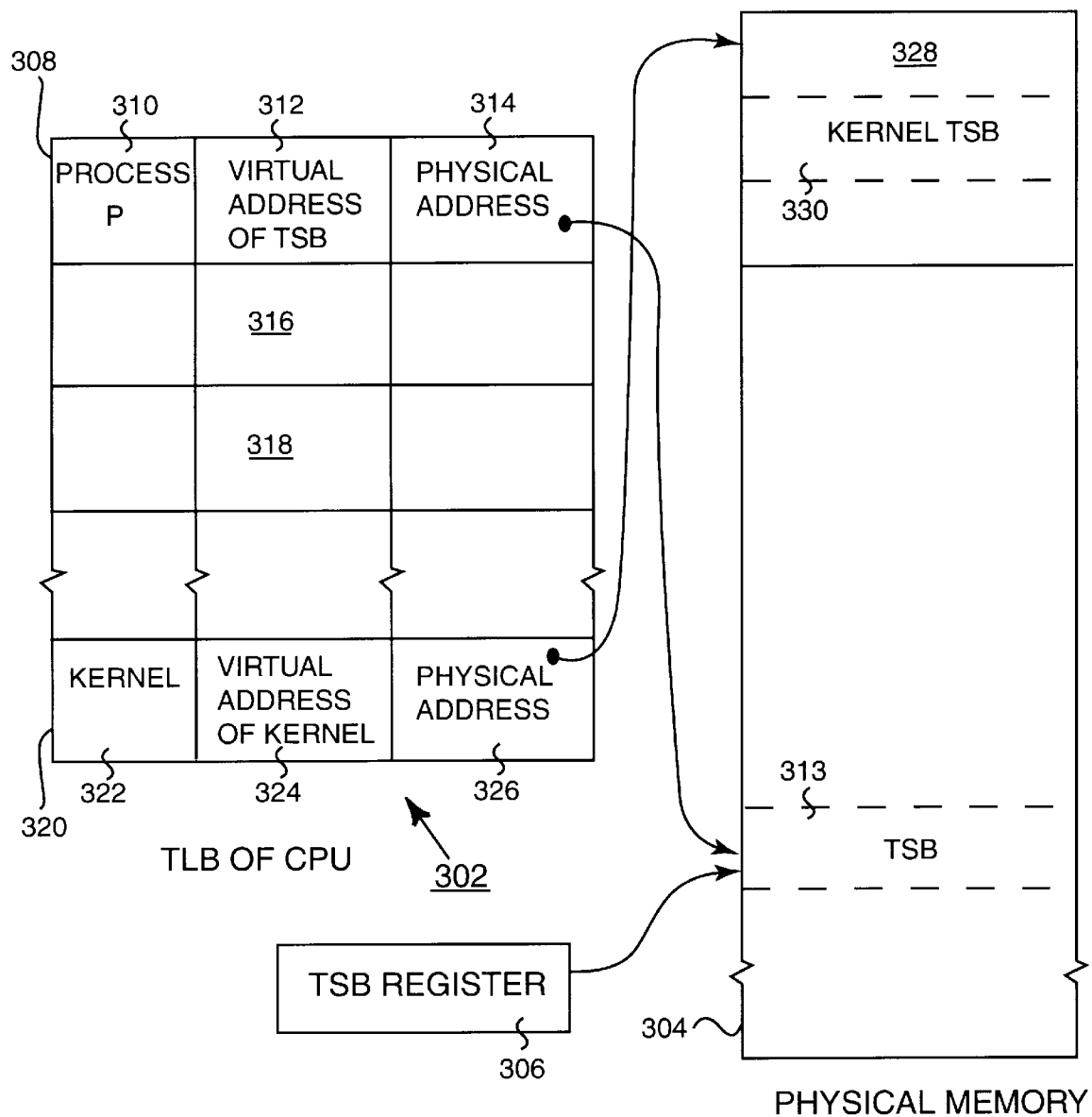
FIG. 7 is a virtual address technique useful for a user TSB and a kernel TSB according to an embodiment of the present invention.

FIG. 7 illustrates an embodiment of the invention in which a user TSB and a kernel TSB are accessed via a virtual addressing scheme. In this embodiment of the invention, there is not only a user TSB for each user process, but also a kernel TSB for system use for all CPUs as well. The kernel TSB is dedicated for system processes. In this embodiment of the invention, both the user TSB and the kernel TSB are stored in virtual storage, thus advantageously freeing up more physical memory for other uses.

Generally, the presence of both a user TSB and a kernel TSB occur with "high-end" systems (more memory and CPUs). For a "low-end" system, there may only be one kernel TSB that is shared between the user and the system. This kernel TSB may have a virtual address.

FIG. 7 illustrates a virtual addressing scheme 300 by which the locations of a user TSB and a kernel TSB are located. Included are a TLB 302 of CPU 1 (as shown in FIG. 5), physical memory 304 and a TSB hardware register 306. In this embodiment, there is only one TLB per processor, although others may be used. Because the user TSB is in virtual storage, an entry in TLB 302 is needed to determine its physical address at a given time. Since only one process is running on a given CPU, only one dedicated entry in the TLB for that CPU is needed to determine the physical location of the TSB for that running process.

In this example, a first entry 308 of TLB 302 is used as a dedicated entry to indicate the physical location of the user TSB for the currently running user process. Entry 308 includes a process identifier 310 that identifies process P as currently running on the CPU where TLB 302 is located. Virtual address 312 indicates the virtual address of TSB 313 which is the TSB currently allocated for user process P. Physical address 314 of entry 308 indicates the address in physical memory 304 where TSB 313 is located. A dedicated hardware register TSB register 306 also contains the physical location of the current user TSB. Advantageously, as different processes are running on the CPU, the physical addresses of their different TSBs can be simply updated in TSB register 306. Also, should process P migrate to a different CPU, it need not repopulate a different TSB with its address translations, but continues to use TSB 313. By merely updating the first dedicated entry of the TLB of the CPU to which it migrates, process P will still have access to its TSB 313.

A last entry 320 of TLB 302 is dedicated to mapping the kernel. Process identifier 322 identifies the kernel process, tag 324 indicates the virtual address of the kernel, and physical address 326 indicates the address in physical memory where kernel 328 is located. In this embodiment, kernel TSB 330 is located in the nucleus data area of the kernel in a known location within the kernel. Because the kernel TSB is allocated from the system nucleus area, the system guarantees a valid translation to exist at all times.

Entry 320 of TLB 302 is a locked, reserved entry dedicated for mapping the kernel. Thus, as the location of the kernel is known, the location of kernel TSB 330 is also always known upon system startup. In this embodiment, a simple variable is set upon system startup to indicate the location of kernel TSB 330. This known kernel TSB address is patched into the TLB miss trap handler of the operating system at startup time in order to fix the address of the kernel TSB in the trap handler so that the address need not be loaded each time the trap handler needs it. Thus, a separate dedicated hardware register is not needed for the kernel TSB. TLB 302 also contains numerous other entries such as entry 316 and entry 318 that provide address translations for other virtual addresses.

In one embodiment of the invention, the size of the kernel TSB is a function of available physical memory. For small system configurations of less than 64 Mbytes of total physical memory, a 128 k byte kernel TSB is allocated and is shared by all processes in the system. For larger system configurations of more than 64 Mbytes, a 512 k byte kernel TSB is allocated which is not shared by any user processes.

In one embodiment of the invention, a bit mask is used to assist in determining which entries in a TSB have been recently added. For example, with a 128 k byte TSB, a 64-bit mask is used. If a bit is set, this indicates that the corresponding chunk in the TSB is a recently added entry. By only searching those portions of the TSB that have a corresponding bit set in the bit mask, the context invalidation process is much faster.

Figure 8:
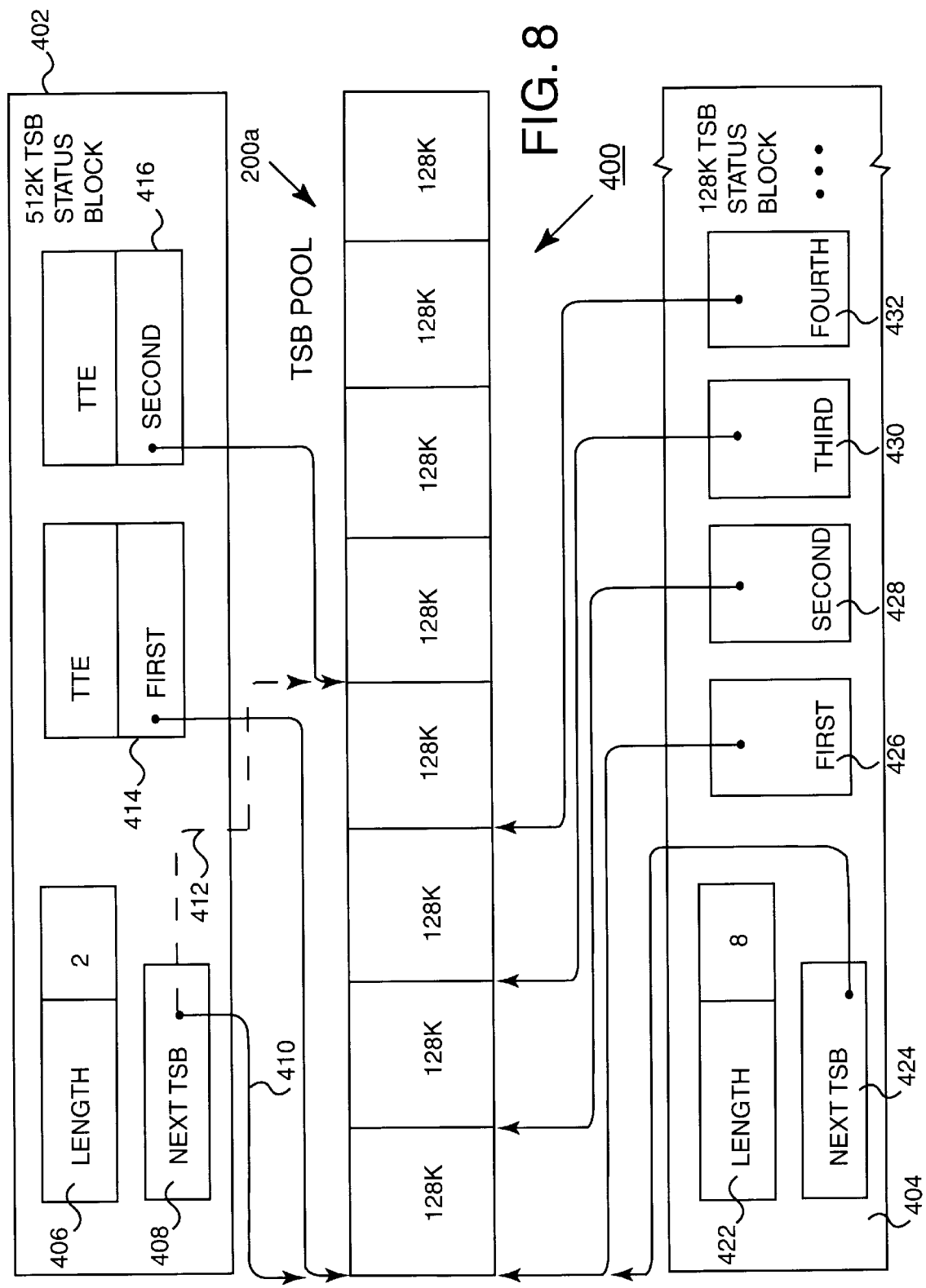
FIG. 8 illustrates a management technique for a TSB pool according to one embodiment of the present invention.

FIG. 8 illustrates a management technique 400 for a TSB pool according to one embodiment of the present invention. It should be appreciated that a wide variety of management techniques and data structures may be used to keep track of individual TSBs within a TSB pool. By way of example, FIG. 8 presents an example of such a technique.

In this technique, a TSB pool 200a supports TSB sizes of 512 k and 128 k bytes and is supported by a 512 k TSB status block 402 and a 128 k TSB status block 404. Of course, should other sizes of TSBs be supported, other status blocks could be used. Also, TSB status blocks 402 and 404 could be combined into one larger status block.

TSB status block 402 includes a length indicator 406 that indicates the length of the TSB pool in 512 k byte chunks. For example, in this example where the TSB pool contains two 512 k byte chunks, the value of length indicator 406 is "2". A next TSB pointer 408 points to the next 512 k size TSB that is available for use by a process. At system startup when all TSBs are available for use, the next TSB pointer contains a value 410 that points to the first 512 k byte chunk. Once this chunk has been assigned to a process, the next TSB pointer is updated to contain a value 412 that indicates the next 512 k byte TSB available for use.

TSB status block 402 also contains an entry 414 that has a first pointer to the first 512 k byte TSB and an entry 416 having a second pointer to the second 512 k byte TSB.

Should TSB pool 200a be larger, there would be a corresponding increase in the number of entries. Thus, entries in the TSB status block point to each of the available TSBs of that particular size, while next TSB pointer 408 indicates the next currently available TSB for use by a process.

In a similar fashion, TSB status block 404 manages the locations and status of all 128 k byte sized TSBs within TSB pool 200a. It should be appreciated that each of these 128 k TSBs share the same physical memory as the 512 k TSBs. When a 512 k byte sized TSB is assigned to a process, the four corresponding 128 k byte sized TSBs may share the same physical memory. In a similar fashion, if a 128 k TSB is assigned to a process, the 512 k byte size chunk in which it resides could be available for use by another process that desires a 512 k TSB.

TSB status block 404 includes a length indicator 422 with a value of "8" indicating that 8 TSBs each of a size of 128 k are available within TSB pool 200a. Also included is a next TSB pointer 424 indicating the next available 128 k TSB for use. Also included are eight pointers indicating the location of each 128 k TSB within the TSB pool. Shown are a first pointer 426, a second pointer 428, a third pointer 430, a fourth pointer 432, etc. Thus, TSB status blocks 402 and 404 manage two different sizes of TSBs, namely 128 k and 512 k byte sized TSBs within the same physical memory of a TSB pool. Of course, other sizes of TSBs may also be stored in this TSB pool and managed in a similar fashion.

Figure 9:
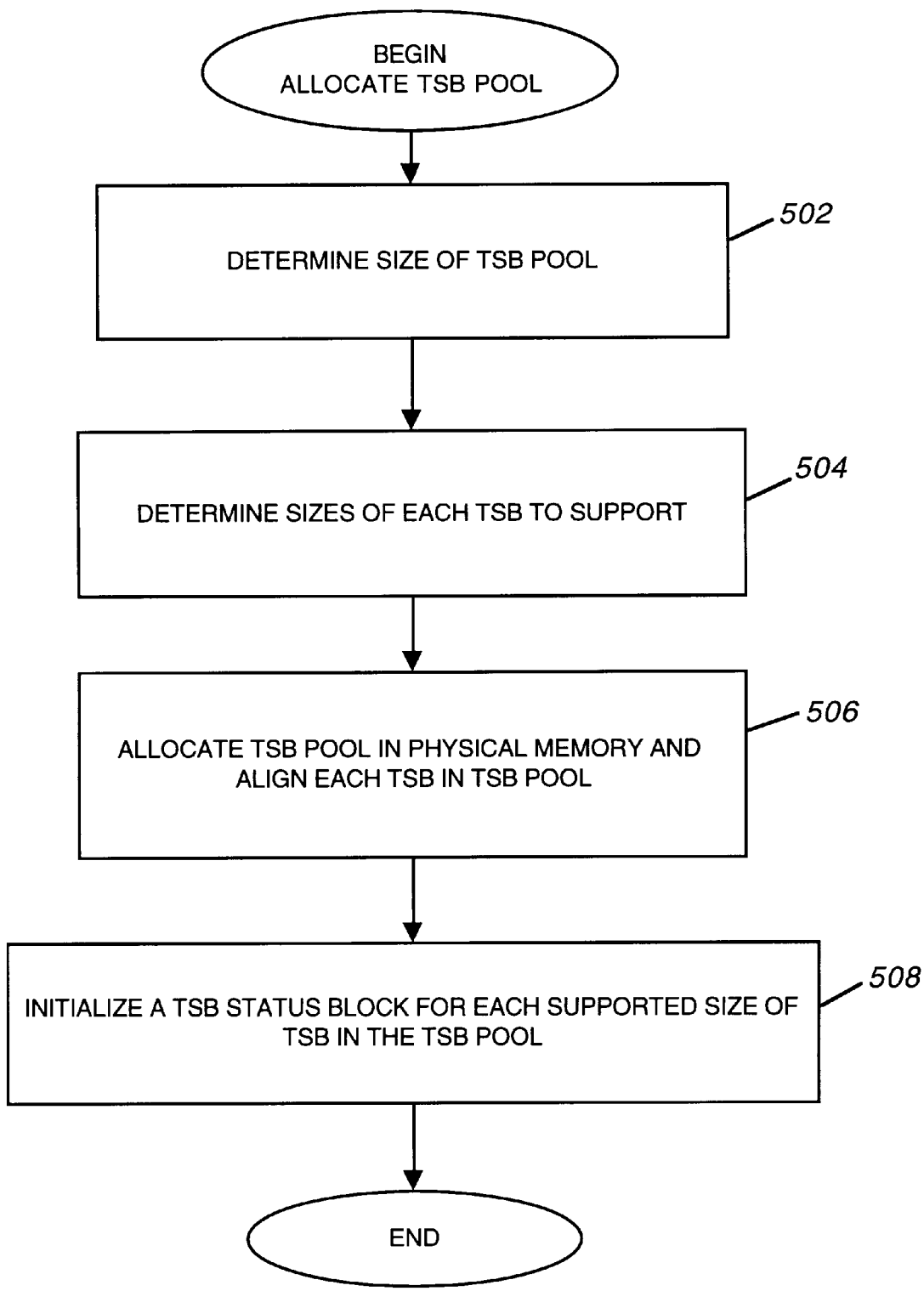
FIG. 9 is a flow chart describing one technique by which a TSB pool is allocated on system startup.

FIG. 9 is a flowchart 500 describing one technique by which a TSB pool is allocated on system startup. The TSB pool is allocated on system startup in order to provide a variety of TSB sizes for later use by a variety of processes. Step 502 determines an appropriate size of the TSB pool. The overall size of the TSB pool may be determined in many different ways depending upon computer system architecture, type of operating system, physical memory present, number of CPUs, etc. By way of example, the TSB pool size may be determined based upon the total physical memory installed in the computer system as described above.

Next, in step 504 the sizes of TSBs to be support are determined. A wide variety of sizes for TSBs may be supported within a given TSB pool. There may be an upper limit on TSB size based upon what page size the memory management unit (MMU) can translate. By way of example, on an UltraSPARC work station page sizes of 8 k, 64 k, 512 k and 4 Mbytes are supported and TSB sizes may range from 8 k bytes up to 4 Mbytes. Of course, larger TSB sizes are possible, but more entries in a TLB may be needed. In a preferred embodiment of the invention, TSB sizes of 128 k bytes and 512 k bytes work well. If the system resizes TSBs often, a larger size of TSB may be appropriate.

Step 506 allocates the TSB pool in physical memory and aligns the TSBs. The different sizes of TSBs within the TSB pool may be allocated in memory in any suitable fashion. By way of example, in a preferred embodiment of the invention, the largest size of TSBs are allocated in contiguous memory in the physical memory. For example, if TSB sizes of 128 k and 512 k are available, then the TSB pool is allocated in physical memory in contiguous chunks of 512 k bytes. However, each of these 512 k bytes chunks need not be contiguous with one another. Preferably, each of these 512 k byte chunks is aligned on a 512 k boundary within the physical memory. This alignment allows a start address of a TSB to have a number of trailing zeros which may then be easily replaced by a TSB offset in order to generate an index into the TSB.

In step 508, a TSB status block is initialized for each supported size of TSB in the TSB pool. Any number of TSB status blocks may be initialized depending upon the number of supported sizes of TSBs. These status blocks may take the form as shown in FIG. 8 or may use any other suitable data structure. In one embodiment of the invention, there are two TSB status blocks, one for 128 k sizes and one for 512 k sizes. A TSB status block may contain other information about TSBs and processes such as which is the smallest size TSB, how many processes are using a TSB of a particular size, etc. After this step, the allocation procedure is done.

Figure 10:
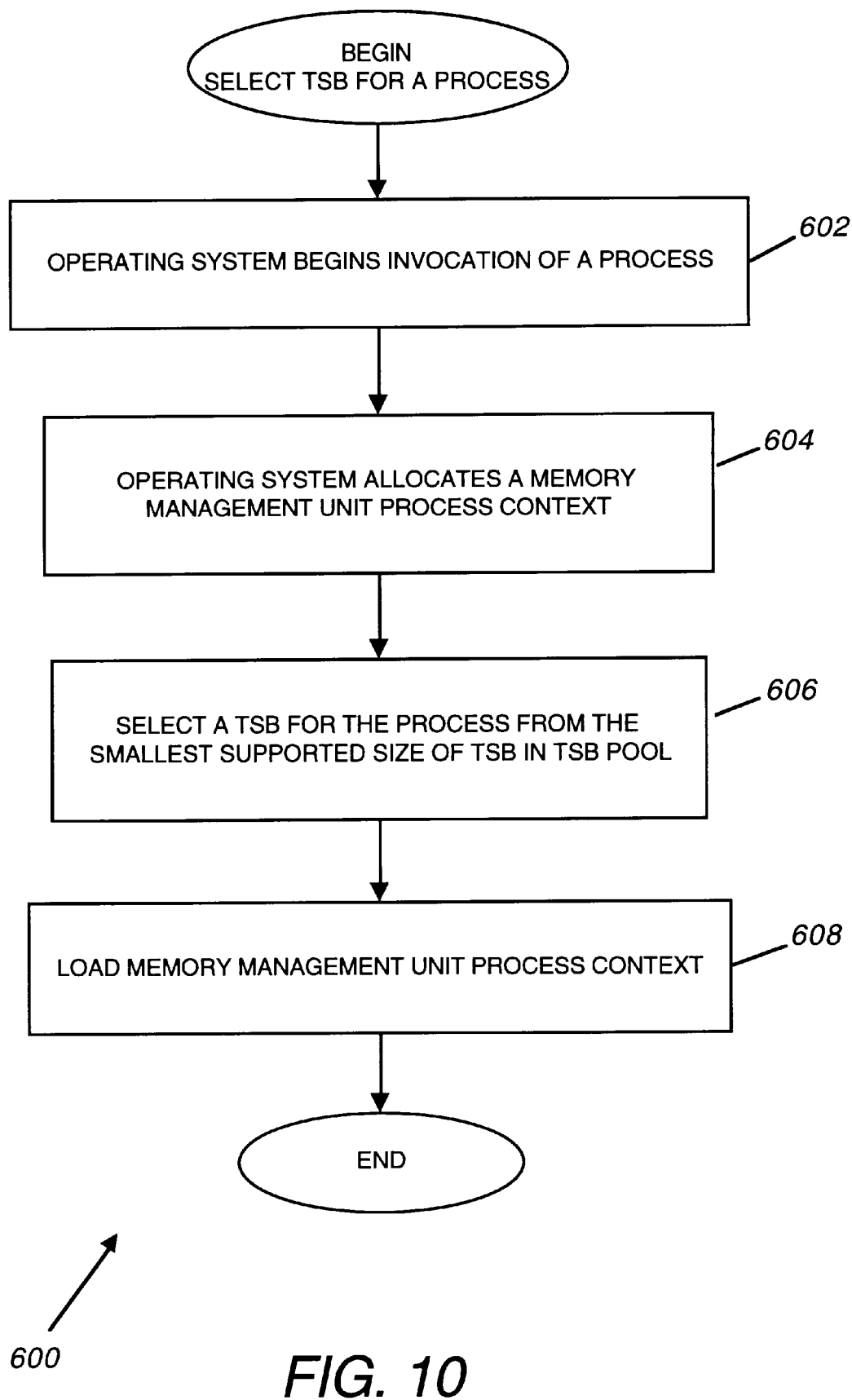
FIG. 10 is a flowchart describing one technique for selecting a suitable TSB for a particular process.

FIG. 10 is a flowchart 600 describing one technique for selecting a suitable TSB for a particular process according to one embodiment of the present invention. Although a TSB may be selected in a variety of ways using the present invention, the following description presents one such technique. In step 602, the operating system begins invocation of a particular process. This process could be created by user request or on behalf of a user. In step 604, the operating system allocates a memory management unit (MMU) process context. In this step, an unused process identifier is allocated for the current process.

In step 606, a TSB is selected for the process from the smallest supported size of TSBs in the TSB pool. Although any size TSB may be selected, choosing one of the smallest supported sizes works well if it can be assumed that a process will be short lived and will not require a lot of memory. Of course, other selection rules may be used. In step 608, the MMU process context is loaded. This step includes loading the TSB register with the address of the selected TSB and also loading the process identifier register with the process identifier allocated to the process. In an embodiment of the present invention, if the TSB is implemented with a virtual address, then the translation table entry (TTE) from the corresponding entry in the TSB status block is loaded into the TLB. For example, if the first 512 k TSB of FIG. 8 has been selected, then the TTE of entry 414 of TSB status block 402 is loaded into the TLB. Once step 608 is completed, then the procedure for selecting a TSB ends.

Figure 11:
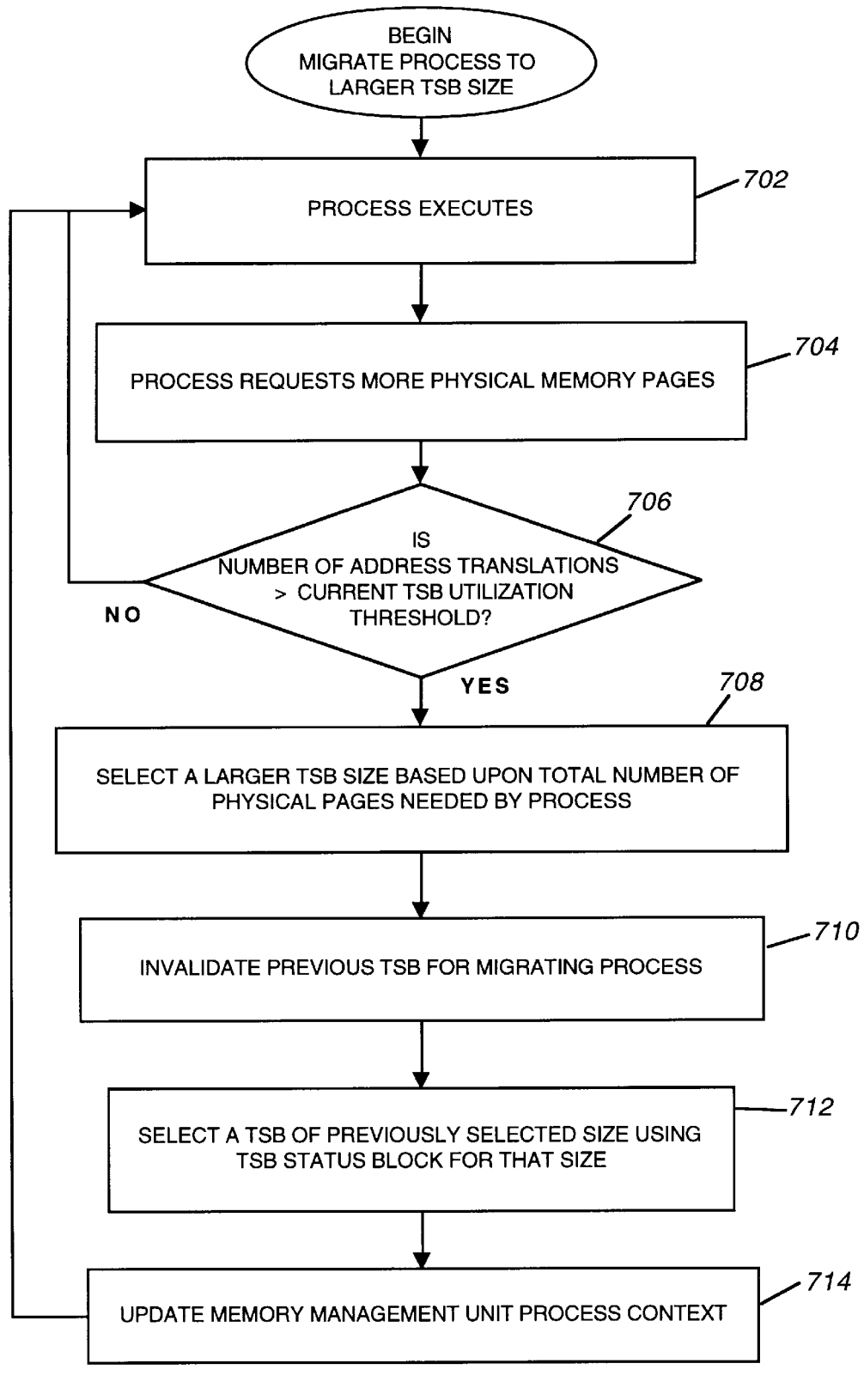
FIG. 11 is a flowchart describing one technique by which a process is migrated to a larger TSB size.

FIG. 11 is a flowchart 700 describing a technique by which a process is migrated to a larger TSB size. Once a TSB has been selected for a particular process and the process is executing, it may be necessary to migrate the process to a larger TSB size. Step 702 indicates that a particular process is executing on a CPU (or on multiple CPUs if the process is multithreaded) and is currently using a particular TSB size.

In step 704 the process has requested more physical memory pages. As a process grows and needs more physical memory, it may be more efficient to use a larger TSB. Thus, step 706 determines whether the number of address translations for the process is greater than a current utilization threshold for the current TSB. A wide variety of techniques may be used to determine if the number of address translations is greater than a particular threshold. By way of example, in one embodiment of the invention, if the number of address translations is greater than 75% of the number of TSB entries, then the process will be migrated to a larger TSB. If not, then the process continues execution in step 702.

In step 708, a larger TSB size is selected based upon the total number of physical pages needed by the process. That is, a larger TSB is selected such that the total pages needed is still less than 75% of the TSB entries. For example, a process using a 128 k TSB may next select a 512 k TSB for use.

In step 710 the previously used TSB is invalidated for only the migrating process.

The TSB may be invalidated using different techniques. One technique that works well is to zero out entries in the previous TSB that correspond to the migrating process. The bit mask for that TSB is also updated in this step. Next, in step 712 a TSB of the new, larger size is selected using the TSB status block for that new larger size. For example, if a new 512 k TSB is to be used, then the next TSB pointer 408 of TSB status block 402 is used to determine which is the next 512 k TSB available for use in TSB pool 200a.

Once a larger TSB has been selected, then in step 714 the MMU process context is updated. Similar to step 608, the TSB register is loaded, although the process ID register need not be reloaded at this point. Also, if virtual addresses are used for the TSB, then the TTE for that TSB is also loaded into the TLB. Once step 714 is completed, then the process continues execution as above in step 702.

COMPUTER SYSTEM EMBODIMENT

Figure 12:
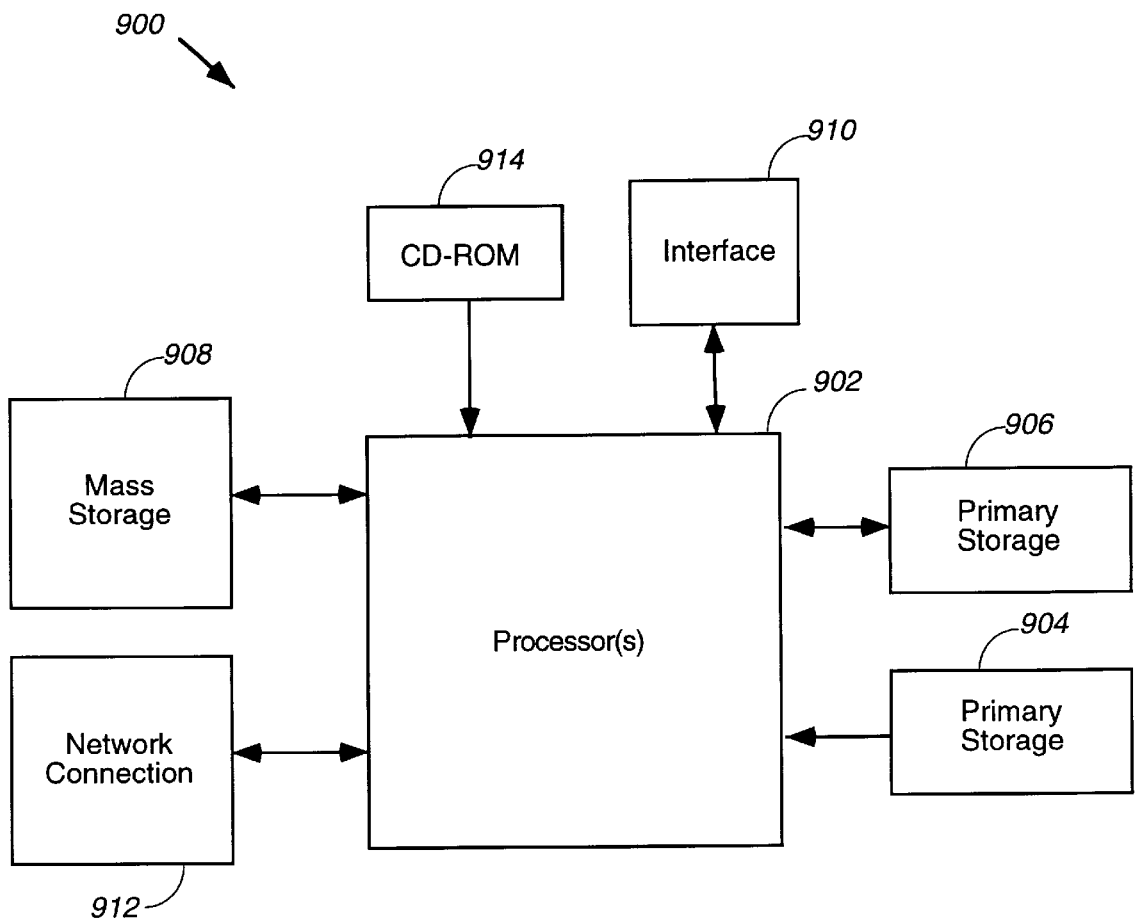
FIG. 12 is a block diagram of a typical computer system suitable for implementing an embodiment of the present invention.

FIG. 12 illustrates a computer system in accordance with an embodiment of the present invention. Computer system 900 includes any number of processors 902 (also referred to as central processing units, or CPUs) that are coupled to storage devices including primary storage 906 (such as random access memory, or RAM) and primary storage 904 (such as a read only memory, or ROM). As is well known in the art, primary storage 904 acts to transfer data and instructions uni-directionally to the CPU and primary storage 906 is used typically to transfer data and instructions in a bi-directional manner. Both of these primary storage devices may include any suitable of the computer-readable media described below. A mass storage device 908 is also coupled bi-directionally to CPU 902 and provides additional data storage capacity and may also include any of the computer-readable media described below. Mass storage device 908 may be used to store programs, data and the like and is typically a secondary storage medium (such as a hard disk) that is slower than primary storage. It will be appreciated that the information retained within mass storage device 908, may, in appropriate cases, be incorporated in standard fashion as part of primary storage 906 as virtual memory. A specific mass storage device such as a CD-ROM 914 passes data uni-directionally to the CPU.

CPU 902 is also coupled to an interface 910 that includes one or more input/output devices such as such as video monitors, track balls, mice, keyboards, microphones, touch-sensitive displays, transducer card readers, magnetic or paper tape readers, tablets, styluses, voice or handwriting recognizers, biometrics readers, or other computers. CPU 902 optionally may be coupled to another computer or telecommunications network using a network connection as shown generally at 912. With such a network connection, it is contemplated that the CPU might receive information from the network, or might output information to the network in the course of performing the above-described method steps.

In addition, embodiments of the present invention further relate to computer storage products with a computer readable medium that have program code thereon for performing various computer-implemented operations. The media and program code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROM disks; magneto-optical media such as floptical disks; and hardware devices that are specially configured to store and execute program code, such as ROM and RAM devices. Examples of program code include both machine code, such as produced by a compiler, and files containing higher level code that may be executed by the computer using an interpreter.

Although the foregoing invention has been described in some detail for purposes of clarity of understanding, it will be apparent that certain changes and modifications may be practiced within the scope of the appended claims. For instance, the invention is applicable to any system where a cache such as a translation storage buffer is used for address translations, and is especially useful where any type of virtual addressing is used. Furthermore, should a translation look-aside buffer not be used, a CPU may access the translation storage buffer directly. The present invention is also applicable to any size computer, and not necessarily those of 32-bit addressing and greater. The TSB pool may be of any size, and may be in physical storage or virtual storage. The TSB status blocks shown are for one specific embodiment, and other similar techniques for achieving the same function of managing the TSB pool may also be used. And a new TSB may be chosen not only when more memory is required, but for other situations including choosing a smaller TSB. Therefore, the described embodiments should be taken as illustrative and not restrictive, and the invention should not be limited to the details given herein but should be defined by the following claims and their full scope of equivalents.

We claim:

1. A computer storage product including a computer-usable medium having computer-readable program code embodied thereon for managing a plurality of translation storage buffers (TSBs) for processes executing in a computer system, said TSBs being selected from a TSB pool in a memory of a computer system and having at least two different sizes, said computer storage product comprising computer-readable program code for effecting the following method:
    identifying said at least two different sizes for said TSBs;
    allocating a TSB pool of said TSBs;
    selecting a small TSB having a first size from said TSB pool for a process; and
    migrating said process from said small TSB to a large TSB having a second size from said TSB pool, said second size being larger than said first size.

2. A computer storage product as recited in claim I wherein said TSBs of one size are coexistent with said TSBs of another size in said memory of said computer system.

3. A computer storage product as recited in claim 1 wherein an address of a starting location in memory for each of said plurality of TSBs is a virtual address, said method further comprising:
    reserving an entry in a translation look-aside buffer (TLB) for a kernel TSB.

4. A computer storage product as recited in claim I wherein said method includes the sub-steps of:
    determining whether the number of physical pages of said process exceeds a percentage of the number of entries in said small TSB.

5. A translation storage buffer (TSB) management data structure embodied in a computer-readable medium suitable for use in a computer system, said TSB management data structure comprising:
    a TSB pool including a plurality of first TSBs of a first size and a plurality of second TSBs of a second size, said plurality of first and second TSBs available to each be assigned to a process executing on said computer system;
    a first TSB information structure arranged to manage said first TSBs and having at least one pointer arranged to indicate the location of said first TSBs in memory of said computer system; and
    a second TSB information structure arranged to manage said second TSBs and having at least one pointer arranged to indicate the location of said second TSBs in memory of said computer system.

6. A TSB management data structure as recited in claim 5 wherein said first TSBs of said first size are arranged to occupy a region of memory in said computer system and said second TSBs of said second size are arranged to occupy said same region of memory.

7. A TSB management data structure as recited in claim 5 wherein an address of a starting location in memory for each of said first and second TSBs is a virtual address, and said computer system includes a CPU having a translation look-aside buffer (TLB) with a first reserved entry for a user TSB and a second reserved entry for a system TSB.

8. A computer storage product including a computer-usable medium having computerreadable program code embodied thereon for allocating a translation storage buffer (TSB) pool in a memory of a computer system, said TSB pool usable for address translation by a plurality of processes executing within said computer system, said computer storage product comprising computer-readable program code for effecting the following method:
    determining a size for said TSB pool in said memory of said computer system;
    indicating a first size for each of a plurality of first TSBs to be represented in said TSB pool;
    indicating a second size for each of a plurality of second TSBs to be represented in said TSB pool, said second size being different from said first size;
    allocating a portion of said memory of said computer system for said TSB pool, said TSB pool in said memory including said first TSBs and said second TSBs;
    initializing a first TSB management means for managing said first TSBs in said TSB pool; and
    initializing a second TSB management means for managing said second TSBs in said TSB pool, whereby each of said processes may be assigned to one of said first or second TSBs of said TSB pool.

9. A computer storage product as recited in claim 8 wherein said second TSBs are coexistent with said first TSBs in said memory of said computer system.

10. A computer storage product as recited in claim 8 wherein an address of a starting location in memory for each of said first and said second TSBs is a virtual address, said method further comprising:
    reserving an entry in a translation look-aside buffer (TLB) for a kernel TSB.

11. A computer storage product as recited in claim 8 wherein said method further comprises:
    initializing at least one pointer of said first TSB management means to indicate the location of said first TSBs in said TSB pool; and
    initializing at least one value of said second TSB management means to indicate the location of said second TSBs in said TSB pool.

12. A computer storage product including a computer-usable medium having computer-readable program code embodied thereon for selecting a translation storage buffer (TSB) for a process, said TSB being selected from a TSB pool in a memory of a computer system, said TSB pool having a plurality of TSBs of at least two different sizes and being usable for address translation by a plurality of processes executing within said computer system, said computer storage product comprising computer-readable program code for effecting the following method:
    allocating a process context for said process;
    determining a first size of a TSB to select for said process from among said at least two different sizes of said plurality of TSBs in said TSB pool;
    accessing a TSB information structure associated with said first size of a TSB, said TSB information structure including information on locations of TSBs of said first size in said TSB pool;
    selecting a TSB of said first size from said TSB pool; and
    assigning said selected TSB to said process.

13. A computer storage product as recited in claim 12 wherein said plurality of TSBs of at least two different sizes are coexistent with each other in said memory of said computer system.

14. A computer storage product as recited in claim 12 wherein an address of a starting location in memory for each of said plurality of TSBs is a virtual address, and said computer system includes a CPU having a translation look-aside buffer (TLB) with a first reserved entry for a kernel TSB.

15. A computer storage product as recited in claim 12 wherein said step of selecting a TSB includes the sub-steps of:

accessing a next pointer of said TSB information structure to determine the location of said TSB of said first size, and updating said next pointer of said TSB information structure to indicate the location of a next available TSB of said first size.

16. A computer storage product as recited in claim 12 wherein a CPU on which said process is executing includes a translation look-aside buffer (TLB) and a single TSB register, said step of assigning said selected TSB includes the sub-steps of:

updating said TSB register with an address of said selected TSB; and entering said address of said selected TSB in a first reserved entry in said TLB.

17. A computer storage product including a computer-usable medium having computer-readable program code embodied thereon for assigning a process in a computer system to a new translation storage buffer (TSB) having a new size from a current TSB having a current size, said new TSB being selected from a TSB pool in a memory of a computer system, said TSB pool having a plurality of TSBs of at least two different sizes and being usable for address translation by a plurality of processes executing within said computer system, said computer storage product comprising computer-readable program code for effecting the following method:

determining whether said current size of said current TSB is no longer suitable for said process;

wherein when it is determined that said current size of said current TSB is no longer suitable for said process, selecting a new size of a TSB for said process;

accessing a TSB information structure associated with said new size;

selecting a new TSB having said new size from said TSB pool; and assigning said new TSB to said process.

18. A computer storage product as recited in claim 17 wherein said TSBs of one size are coexistent with said TSBs of another size in said memory of said computer system.

19. A computer storage product as recited in claim 17 wherein an address of a starting location in memory for each of said plurality of TSBs is a virtual address, and said computer system includes a CPU having a translation look-aside buffer (TLB) with a first reserved entry for a kernel TSB.

20. A computer storage product as recited in claim 17 wherein said step of selecting a new TSB includes the sub-steps of:

accessing a next pointer of said TSB information structure to determine the location of said new TSB of said new size, and updating said next pointer of said TSB information structure to indicate the location of a next available TSB of said new size.

21. A computer storage product as recited in claim 17 wherein a CPU on which said process is executing includes a translation look-aside buffer (TLB) and a single TSB register, said step of assigning said new TSB includes the sub-steps of:

updating said TSB register with an address of said new TSB; and entering said address of said new TSB in a first reserved entry in said TLB.

22. A computer storage product as recited in claim 17 wherein said method includes the sub-steps of:

determining whether the number of physical pages of said process exceeds a percentage of the number of entries in said current TSB;

selecting a larger size for said new size of a TSB.

23. A computer implemented method for managing a plurality of translation storage buffers (TSBs) for processes executing in a computer system, said TSBs being selected from a TSB pool in a memory of a computer system and having at least two different sizes, said method comprising the steps of:

identifying said at least two different sizes for said TSBs;

allocating a TSB pool of said TSBs;

selecting a small TSB having a first size from said TSB pool for a process; and migrating said process from said small TSB to a large TSB having a second size from said TSB pool, said second size being larger than said first size.

24. A computer implemented method as recited in claim 23 wherein said TSBs of one size and said TSBs of another size reside contemporaneously in said memory of said computer system.

25. A computer implemented method as recited in claim 23 wherein an address of a starting location in memory for each of said plurality of TSBs is a virtual address, said computer implemented method further including the step of reserving an entry in a translation look-aside buffer (TLB) for a kernel TSB.

26. A computer implemented method as recited in claim 23 further including the substep of determining whether the number of physical pages of said process exceeds a percentage of the number of entries in said small TSB.

27. A computer system comprising:

a central processing unit (CPU);

a read only memory (ROM) coupled to said CPU;

a random access memory (RAM) coupled to said CPU;

a computer readable medium storing a translation storage buffer (TSB) management data structure, said TSB management data structure including:

a TSB pool including a plurality of first TSBs of a first size and a plurality of second TSBs of a second size, said plurality of first and second TSBs available to each be assigned to a process executing on said computer system;

a first TSB information structure arranged to manage said first TSBs and having at least one pointer arranged to indicate the location of said first TSBs in memory of said computer system; and a second TSB information structure arranged to manage said second TSBs and having at least one pointer arranged to indicate the location of said second TSBs in memory of said computer system.

28. A computer system as recited in claim 27 wherein said first TSBs of said first size are arranged to occupy a certain region of memory in said computer system and said second TSBs of said second size are arranged to occupy said certain region of memory, and further wherein an address of a starting location in memory for each of said first and second TSBs is a virtual address, and said computer system includes a CPU having a translation look aside buffer (TLB) with a first reserved entry for a user TSB and a second reserved entry for a system TSB.

29. A computer system as recited in claim 27 wherein said computer system is one of a plurality of computer systems coupled together via a computer network, said TSB pool enabling the implementation of virtual memory distributed across the computer network.

30. A computer system as recited in claim 29 wherein said virtual memory is able to hide its distributed nature.

31. A computer implemented method for allocating a translation storage buffer (TSB) pool in a memory of a computer system, said TSB pool usable for address translation by a plurality of processes executing within said computer system, said computer implemented method comprising the steps of:

determining a size for said TSB pool in said memory of said computer system;

indicating a first size for each of a plurality of first TSBs to be represented in said TSB pool;

indicating a second size for each of a plurality of second TSBs to be represented in said TSB pool, said second size being different from said first size;

allocating a portion of said memory of said computer system for said TSB pool, said TSB pool in said memory including said first TSBs and said second TSBs;

initializing a first TSB management means for managing said first TSBs in said TSB pool; and initializing a second TSB management means for managing said second TSBs in said TSB pool, whereby each of said processes may be assigned to one of said first or second TSBs of said TSB pool.

32. A computer implemented method as recited in claim 31 wherein said second TSBs are coexistent with said first TSBs in said memory of said computer system.

33. A computer implemented method as recited in claim 31 wherein an address of a starting location in memory for each of said first and said second TSBs is a virtual address, said computer implemented method further comprising reserving an entry in a translation look-aside buffer (TLB) for a kernel TSB, said computer implemented method further comprising the steps of:

initializing at least one pointer of said first TSB management means to indicate the location of said first TSBs in said TSB pool; and initializing at least one value of said second TSB management means to indicate the location of said second TSBs in said TSB pool.

34. A computer implemented method for selecting a translation storage buffer (TSB) for a process, said TSB being selected from a TSB pool in a memory of a computer system, said TSB pool having a plurality of TSBs of at least two different sizes and being usable for address translation by a plurality of processes executing within said computer system, said computer implemented method comprising the steps of:

allocating a process context for said process;

determining a first size of a TSB to select for said process from among said at least two different sizes of said plurality of TSBs in said TSB pool;

accessing a TSB information structure associated with said first size of a TSB, said TSB information structure including information on locations of TSBs of said first size in said TSB pool;

selecting a TSB of said first size from said TSB pool; and assigning said selected TSB to said process.

35. A computer implemented method as recited in claim 34 wherein said step of selecting a TSB includes the sub-steps of:

accessing a next pointer of said TSB information structure to determine the location of said TSB of said first size, and updating said next pointer of said TSB information structure to indicate the location of a next available TSB of said first size.

36. A computer implemented method for assigning a process in a computer system to a new translation storage buffer (TSB) having a new size from a current TSB having a current size, said new TSB being selected from a TSB pool in a memory of a computer system, said TSB pool having a plurality of TSBs of at least two different sizes capable of being coexistent in said memory of said computer system, and being usable for address translation by a plurality of processes executing within said computer system, said computer implemented method comprising the steps of:

determining whether said current size of said current TSB is no longer suitable for said process;

wherein when it is determined that said current size of said current TSB is no longer suitable for said process, selecting a new size of a TSB for said process;

accessing a TSB information structure associated with said new size;

selecting a new TSB having said new size from said TSB pool, said step of selecting a new TSB including the sub-steps of a) accessing a next pointer of said TSB information structure to determine the location of said new TSB of said new size and b) updating said next pointer of said TSB information structure to indicate the location of a next available TSB of said new size; and assigning said new TSB to said process, said step of assigning said new TSB to said process including the sub-steps of a) updating said TSB register with an address of said new TSB and entering said address of said new TSB in a first reserved entry in said TLB.

* * * * *